United States Patent
Wu

(10) Patent No.: US 11,758,299 B2
(45) Date of Patent: Sep. 12, 2023

(54) SYSTEMS AND METHODS FOR GENERATING A CORRECTED IMAGE OUTPUT BY A CAMERA HAVING A GLOBAL SHUTTER

(71) Applicant: GM Cruise Holdings LLC, San Francisco, CA (US)

(72) Inventor: Qihong Wu, Dublin, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 42 days.

(21) Appl. No.: 17/364,858

(22) Filed: Jun. 30, 2021

(65) Prior Publication Data
US 2023/0007193 A1   Jan. 5, 2023

(51) Int. Cl.
| | |
|---|---|
| *H04N 25/67* | (2023.01) |
| *H04N 25/671* | (2023.01) |
| *G01S 17/931* | (2020.01) |
| *H04N 25/75* | (2023.01) |
| *G01S 17/89* | (2020.01) |

(52) U.S. Cl.
CPC ........... *H04N 25/671* (2023.01); *G01S 17/89* (2013.01); *G01S 17/931* (2020.01); *H04N 25/75* (2023.01)

(58) Field of Classification Search
CPC .... H04N 5/3651; H04N 5/378; G01S 17/931; G01S 17/89
See application file for complete search history.

(56) References Cited

U.S. PATENT DOCUMENTS

| | | | |
|---|---|---|---|
| 11,418,732 B2* | 8/2022 | Daures | H04N 5/06 |
| 2009/0268063 A1 | 10/2009 | Ellis-Monaghan et al. | |
| 2016/0057369 A1 | 2/2016 | Wolfe et al. | |
| 2022/0201229 A1* | 6/2022 | Guruaribam | H04N 5/353 |

FOREIGN PATENT DOCUMENTS

| | | |
|---|---|---|
| WO | 2016006153 A1 | 1/2016 |
| WO | 2023277934 A1 | 1/2023 |

OTHER PUBLICATIONS

"International Search Report and Written Opinion for PCT Patent Application No. PCT/US2021/048556", dated Mar. 28, 2022, 12 pages.

* cited by examiner

*Primary Examiner* — Twyler L Haskins
*Assistant Examiner* — Fayez A Bhuiyan
(74) *Attorney, Agent, or Firm* — CALFEE, HALTER & GRISWOLD LLP

(57) ABSTRACT

Technologies are described herein that are configured to generate a corrected image by addressing photo response nonuniformity (PRNU) in a camera having a global shutter. A calibration procedure is described, where correction factors for each pixel in an image sensor are computed and subsequently employed to generate improved images.

20 Claims, 11 Drawing Sheets

SYSTEMS AND METHODS FOR GENERATING A CORRECTED IMAGE OUTPUT BY A CAMERA HAVING A GLOBAL SHUTTER

BACKGROUND

A camera having a global shutter exposes an entire scene to each pixel in an image sensor at the same time and for the same amount of time. Therefore, unlike a camera with a rolling shutter, which has pixels switch on and off from one side of the image sensor to another (e.g., from top to bottom) like a scan, a camera with a global shutter captures a scene using all of the pixels of the image sensor at once. Cameras with global shutters are particularly advantageous when capturing images of objects moving at high speeds; an issue with cameras with global shutters, however, is photo response nonuniformity (PRNU).

With more particularly, when a fixed, uniform field of light falls across pixels of an image sensor in a camera having a global shutter, values readout from pixels in the image sensor should be identical. In actuality, however, and due to a variety of factors including variations in pixel, parasitic light sensitivity, amplification gain, and further due to values from the pixels not being readout at the same time, the pixels will have different values when readout. This variance is referred to as PRNU.

With still more detail, as referenced above, in a camera with a global shutter, pixels in the image sensor are exposed to a scene at the same time and for the same duration of time. Readout electronics of cameras with global shutters, however, readout values from pixels row by row. Therefore, in an example, a pixel in a first row of the image sensor has a first value readout therefrom prior to a second value being readout from a second pixel in a tenth row of the image sensor, despite both the first and second values being employed to generate an image of the scene. In the time between when the first value of the first pixel is readout from the image sensor and when the second value of the second pixel is readout from the image sensor, the second pixel accumulates additional charge (e.g., caused by ambient light, electronics of the image sensor, etc.). Therefore, even when the first pixel and the second pixel are exposed to light of the same intensity for the same amount of time, the second value readout from the second pixel tends to be higher than the first value readout from the first pixel. Depending upon the exposure time used to capture the scene, the resultant image may be suboptimal. As exposure time decreases, the PRNU tends to become worse.

Pixels of digital cameras with electronic shutters include sensor nodes and memory nodes, where a sensor node accumulates charge when "on" and a memory node retains the charge until its value is readout from the memory node. Conventional approaches for addressing PRNU include physically shielding memory nodes to minimize light reaching such memory nodes. Shielding, however, can be expensive, and may significantly increase the cost of a camera. High cost renders many cameras having global shutters unsuitable for certain types of applications. Contrarily, use of a camera with a global shutter that outputs suboptimal images renders such a camera unsuitable for applications where high-quality images are desired.

SUMMARY

The following is a brief summary of subject matter that is described in greater detail herein. This summary is not intended to be limiting as to scope of the claims.

Described herein are various technologies pertaining to a camera having a global shutter, where correction factors are applied to pixel values readout from an image sensor to form a corrected image, where photo response non-uniformity (PRNU) is addressed by applying the correction factors to the pixel values. With more specificity, during a calibration procedure, a matrix of correction factors is computed, where each pixel in the image sensor has a respective correction factor assigned thereto from the matrix of correction factors. With respect to an individual pixel, a correction factor for the pixel addresses a dark signal portion of a value readout from the pixel, where the dark signal portion is a portion of the value readout from the pixel that is caused by a "dark signal" (a signal that is independent of light that was incident upon the pixel during an exposure). The correction factor for the pixel additionally addresses parasitic light sensitivity of the pixel and gain associated with the image sensor. As noted above, the camera has a global shutter, such that when the camera generates an image, the pixels of the image sensor are exposed to a scene at the same time and for the same amount of time; however, pixels in different rows are readout at different times, thereby contributing to nonuniformity of outputs across the pixels, where PRNU is caused by different pixels having different parasitic light sensitivity and gain.

In connection with computing a correction factor for a pixel in the image sensor of the camera, a calibration process described herein is undertaken. The image sensor is placed in an environment that includes no light (or as little light as possible). In other words, the flat field intensity of light to which the pixel is exposed is set to zero. Thereafter, the camera is operated to generate several data frames (images), where the data frames are captured when the camera has different integration times (exposure times). Thus, for example, the camera is configured to generate six data frames: 1) a first data frame when a first integration time is employed; 2) a second data frame when a second integration time is employed; 3) a third data frame when a third integration time is employed, etc. Continuing with this example, the result is six different values readout from the pixel for six different integration times, where the flat field intensity of light to which the pixel is exposed is zero. The values for the pixel can be linearly fitted to identify a slope that represents an increase in intensity with respect to integration time, and a dark signal constant value that represents the dark signal when the integration time is set to zero (the intercept of the linear fitting). Accordingly, for a given integration time, the correction factor accounts for a dark signal portion of the value readout from the pixel. When the camera is operated, and based upon the integration time used to capture a data frame, the dark signal portion in the correction factor is subtracted from the value readout from the pixel.

To account for gain and parasitic light sensitivity, the image sensor is exposed to a flat light field of uniform (predefined) intensity, where the intensity is non-zero. While the image sensor is exposed to the uniform flat light field, the camera is caused to generate several data frames, each with a different integration time. Therefore, with respect to the pixel, several values will be readout from the pixel, with each value corresponding to a different integration time. Contrary to conventional approaches, during the calibration process, each value readout from the pixel is normalized based upon a value readout from a second pixel, where the second pixel is in a row that is readout first by readout electronics of the camera. For instance, when the pixel is in a tenth row of the image sensor and pixels in a first row of the image sensor are readout first by the readout electronics, the value readout for the pixel is normalized by at least one value readout from at least one pixel in the first row. In an example, an average of values readout from pixels in the first row is computed, and the pixel value is normalized by such average. This process is repeated for each value of the pixel readout with the different integration times, thereby creating several normalized values. These normalized values are subjected to a nonlinear fitting, such that a formula that defines a curve that is representative of influence of system gain and parasitic light intensity with respect to integration time is determined. The correction factor includes the formula that defines the curve, and therefore during operation of the camera and given an integration time, the correction value for the pixel is employed to account for a portion of the value caused by system gain and parasitic light sensitivity of the pixel. Hence, in an output image, PRNU is addressed by the correction factor. Correction factors, as indicated above, are computed for each pixel in the image sensor.

In an embodiment, the camera with the global shutter can be included in an autonomous vehicle (AV). The AV includes the camera with a global shutter, a lidar system, and/or a radar system. A computing system of the AV receives an image output by the camera (e.g., corrected through use of the correction factors), and additionally receives a point cloud output by the lidar system and/or radar system. The AV performs a driving maneuver based upon the image and the point cloud.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
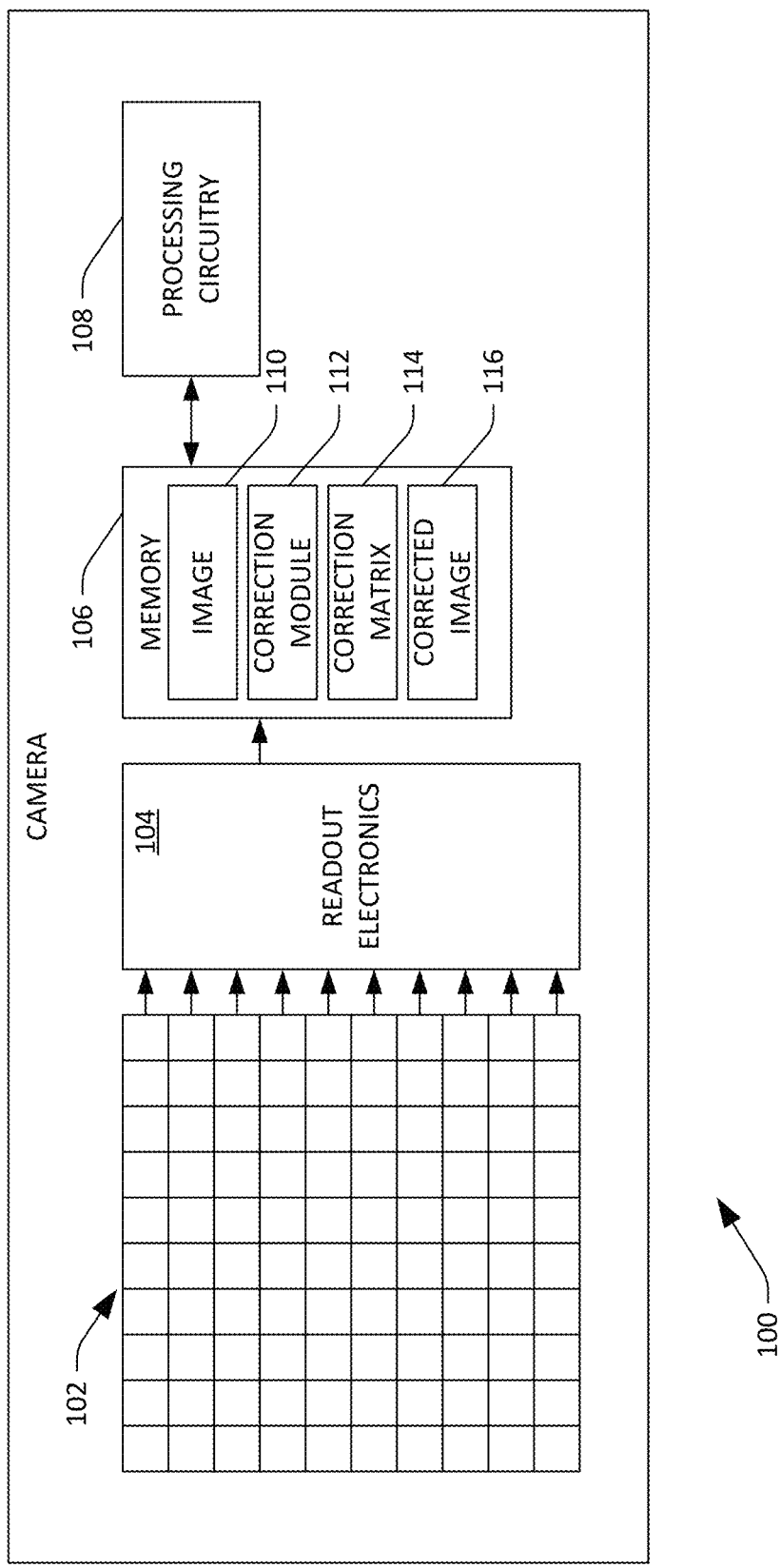
FIG. 1 is a schematic that depicts a camera having a global shutter.

Various technologies pertaining to generating improved images in cameras with global shutters are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to using correction factors to address photo response nonuniformity (PRNU) with respect to pixels in a camera that uses a global shutter to generate images. In an example, such a camera can be included in an autonomous vehicle (AV), and the AV can autonomously maneuver based upon images output by the camera. As will be described in greater detail herein, the camera employs correction factors in a correction matrix to address PRNU associated with pixels in an image sensor of the camera. The correction factors are computed to address PRNU associated with dark signals of the pixels and are further configured to address parasitic light sensitivity of the pixels, as well as system gain. With respect to the parasitic light sensitivity and system gain, the correction factors are computed by capturing several data frames (Images) when a uniform flat light field is applied over pixels of the image sensor of the camera throughout an integration time. Multiple data frames are captured, with each data frame captured using a different integration (exposure) time. With respect to a single pixel, and for each integration time, a value readout from the pixel is normalized based upon at least one value readout from at least one pixel in a predefined row of pixels, where pixels in the predefined row are readout first by readout electronics of the camera, and further where the value readout from the at least one pixel in the predefined row corresponds to the same integration time. Value(s) from pixels in a row that is readout first by readout electronics are used to normalize value(s) readout from the pixel due to the small amount of time between when the pixels in the row cease being exposed to light and when values are readout from such pixels. Additional detail is set forth below.

With reference now to FIG. 1, a camera 100 that uses a global shutter in connection with generating images is illustrated. The camera 100 includes an image sensor 102. The image sensor 102 includes several pixels (shown as multiple rows and columns of pixels), where each pixel includes a sensor node and a memory node. The sensor node is configured to convert light that is incident upon the sensor node into electrical charge, and the memory node is configured to retain such charge until readout from the memory node. Ideally, the memory node does not contribute to the charge retained therein; however, in actuality, due to physical properties of the memory node, electronics of the image sensor 102, sensitivity to parasitic light, etc., after the charge is retained in the memory node, additional charge is accumulated over time, where an amount of the additional charge is dependent upon an integration time and an amount of time that the charge is stored in the memory node before being readout. This accumulation of additional charge is problematic in cameras with global shutters (such as the camera 100), as values are read from memory nodes of different pixels at different times, despite the sensor nodes being exposed to a scene at the same time and for the same duration of time. For instance, values are readout pixels in the first row of pixels, followed by values being readout from pixels in the second row of pixels, followed by values being readout from pixels in the third row of pixels, and so forth. Therefore, even though the sensor nodes of the pixels are exposed to the scene at the same time and for the same amount of time, values are readout from different pixels at different times, causing PRNU.

The camera 100 further includes readout electronics 104 that are configured to readout values from the memory nodes of the pixels in the image sensor 102, where the readout electronics 104 reads out values from pixels row by row (e.g., from top to bottom).

The camera 100 also includes memory 106 and processing circuitry 108 that is operably coupled to the memory 106, where the memory 106 is configured to store data that is accessible to the processing circuitry 108 and instructions that are executed by the processing circuitry 108. In the example shown in FIG. 1, the memory 106 includes an image 110 (also referred to as a data frame), where the image 110 includes a matrix of values that respectively correspond to the matrix of pixels in the image sensor 102. Thus, the image 110 includes values readout from the pixels of the image sensor 102 by the readout electronics 104.

The memory 106 further includes a correction module 112 that is executed by the processing circuitry 108, where the correction module 112 is configured to apply correction factors to the values of the image 110.

The memory 106 also includes a correction matrix 114 that includes correction factors that respectively correspond to the pixels of the image sensor 102. Therefore, each pixel of the image sensor 102 has a correction factor assigned thereto in the correction matrix 114. A correction factor for a pixel in the image sensor 102 addresses two portions of a value readout from the pixel that are not caused by light incident upon the pixel during an exposure of the pixel. These two portions are: 1) a dark signal portion; and 2) and a PRNU portion. The dark signal portion is a portion of the value readout from the pixel that is independent of the light incident upon the sensor node of the pixel during exposure of the pixel. In other words, the dark signal portion is caused by electronics of the camera 100 (e.g., caused by background noise in the camera). Therefore, if no light was incident upon the sensor node of the pixel during an exposure, electronics of the camera 100 nevertheless cause the memory node to accumulate charge that is subsequently readout by the readout electronics 104. The correction factor in the correction matrix 114 for the pixel addresses the dark signal portion, such that when the correction module 112 applies the correction factor to the value readout from the memory node of the pixel, the dark signal portion of the readout value is removed from the readout value.

The PRNU portion of the readout value is caused by parasitic light sensitivity of the memory node of the pixel and system gain. As will be described in greater detail herein, the correction factor for the pixel is determined during a calibration phase and is based upon at least one value readout from a second pixel during the calibration phase, where the second pixel is included in a row of the image sensor 102 that is readout by the readout electronics 104 first. The calibration phase that is employed in connection with computing correction factors of the correction matrix 114 will be described in greater detail below.

Upon the correction module 110 respectively applying the correction factors of the correction matrix 114 to values in the image 110, the correction module 112 outputs a corrected image 116. Therefore, in the corrected image 116, PRNU has been addressed by the processing circuitry 108 through utilization of the correction factors in the correction matrix 114. In an example, the corrected image 116 can be provided to a computing system of an AV, and the AV performs a driving maneuver based upon the corrected image 116. The driving maneuver may be a turn, deceleration, acceleration, or other suitable driving maneuver.

Figure 2:
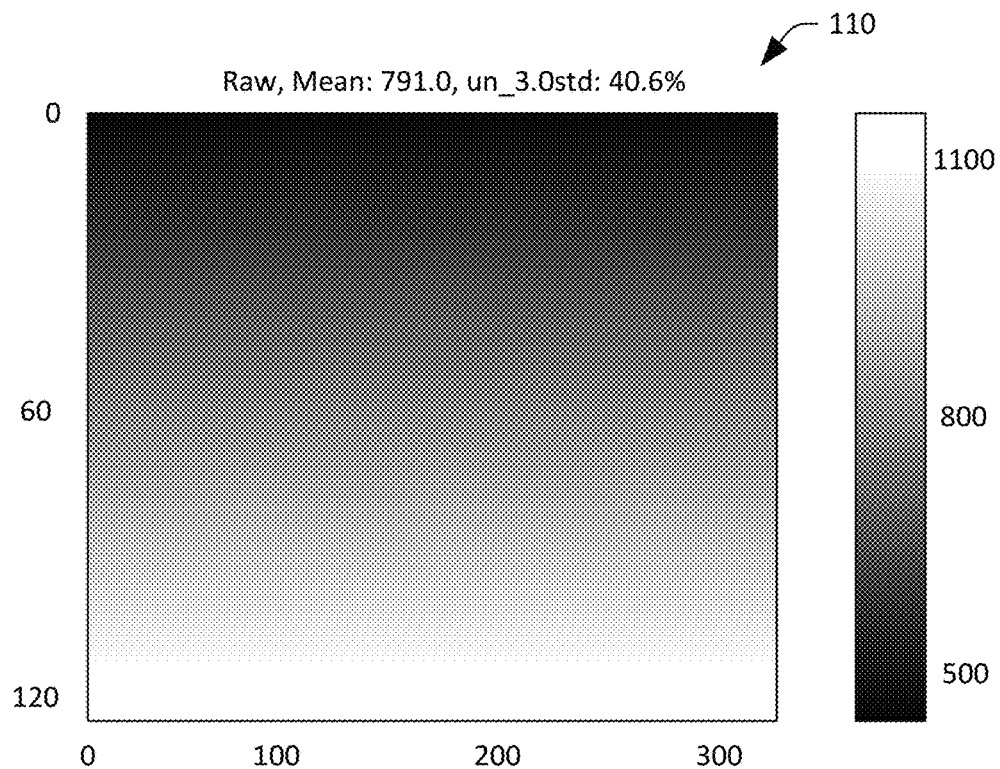
FIG. 2 depicts a raw data frame output by a camera having a global shutter.

Referring now to FIG. 2, an example depiction of the image 110 is set forth. The image 110 illustrated in FIG. 2 represents values readout from the memory nodes of pixels of the image sensor 102 by the readout electronics 104 prior to the image 110 being subjected to correction by the correction module 112. The image 110 depicted in FIG. 2 was constructed based upon the pixels of the image sensor 102 being exposed to a uniform flat field of light during an integration window. Hence, intensity values of the pixels of the image 110 should be uniform. As can be ascertained from viewing the image 110 depicted in FIG. 2, however, intensities of values of pixels in the image 110 are not uniform. Rather, the intensities increase from top to bottom, which corresponds to times when pixels of the image sensor 102 had values read therefrom.

Figure 3:
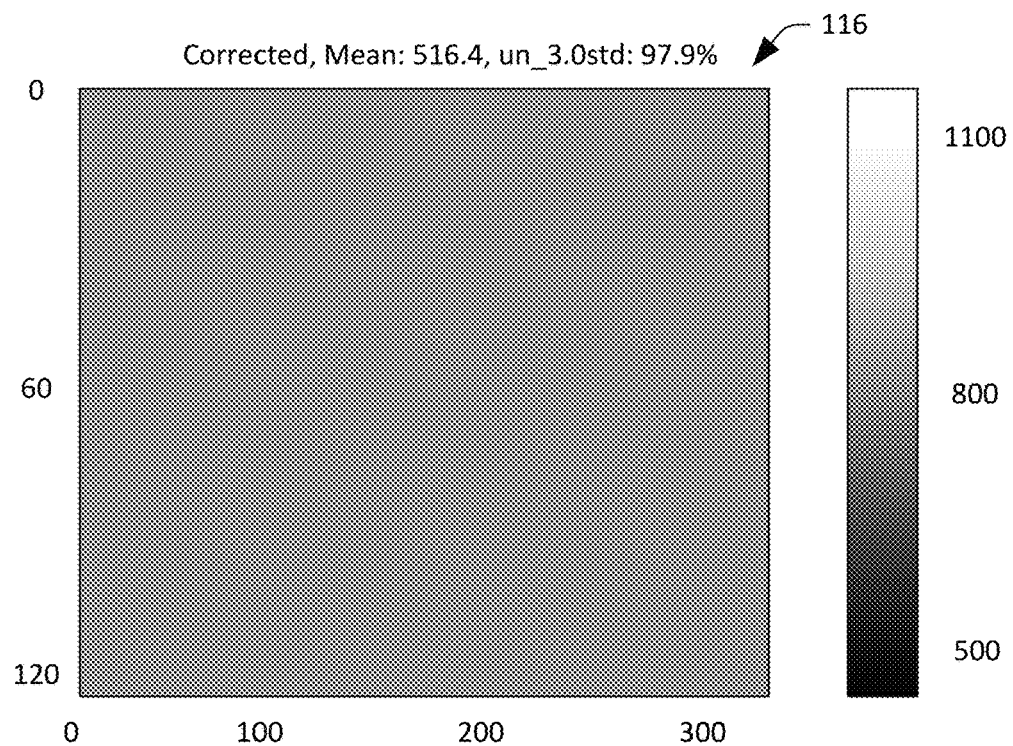
FIG. 3 illustrates a data frame output by a camera having a global shutter, where the data frame illustrated in FIG. 3 has been subject to correction for the raw image shown in FIG. 2.

Referring now to FIG. 3, an example depiction of the corrected image 116 is presented. Put differently, the image 116 depicted in FIG. 3 is the image 110 depicted in FIG. 2 subsequent to such image 110 being corrected by the correction module 112. From reviewing FIG. 3, it can be ascertained that the corrected image 116 has improved uniform intensity across pixels when compared to the image illustrated in FIG. 2, which corresponds to the uniform flat field of light applied across the image sensor 102 during exposure.

Figure 4:
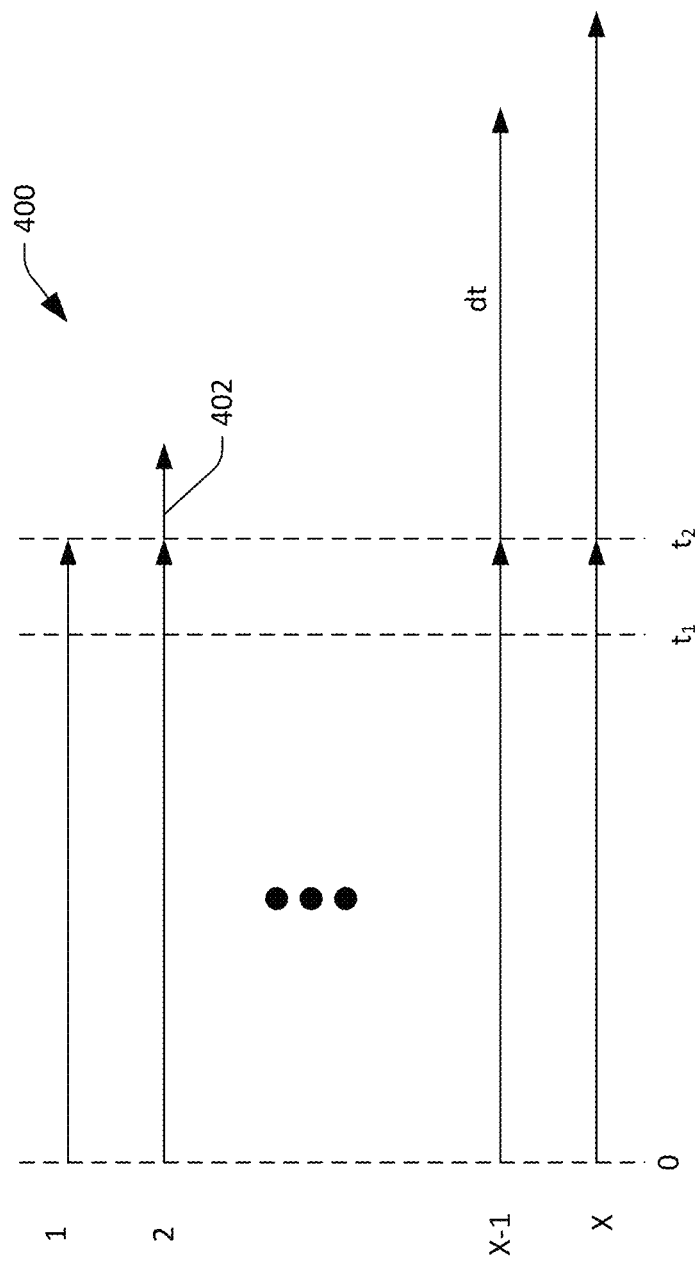
FIG. 4 is a timing diagram that illustrates times when different pixel values are readout from pixels in different rows of an image sensor in a camera having a global shutter.

With reference now to FIG. 4, a timing diagram 400 that illustrates an integration time for pixels in the image sensor 102 as well as an amount of time subsequent to the integration time when values are read from (memory nodes of) the pixels. As illustrated in the schematic of FIG. 4, the image sensor 102 includes X rows of pixels. With respect to an image generated by the camera 100, the camera 100 has an integration time of $t_2$, which includes an amount of time that the pixels are exposed to an environment and amount of time $t_2$–$t_3$) for transferring charge from the sensor nodes of the pixels to the memory nodes of the pixels. As the image sensor 102 captures an image of an entirety of a scene at the same time, charges are transferred from the sensor nodes of the pixels to the memory nodes of the pixels at the same time.

Subsequently, the readout electronics 104 begins to readout values from the memory nodes of the pixels row by row. Hence, at time $t_2$ (or immediately after $t_2$), the readout electronics 104 reads out values from memory nodes of pixels in the first row of the image sensor 102. Subsequent to reading out the values from the memory nodes of the pixels in the first row, the readout electronics 104 reads out values from memory nodes of pixels in the second row, where the additional time is represented by reference numeral 402. The time from when the charge is stored in the memory node of the pixel increases as the row number increases and is represented by dt. This increase in time, for example, contributes to nonuniformity between values read from memory nodes of pixels in the first row and values readout from memory nodes of pixels in later rows (e.g., the Xth row).

Figure 5:
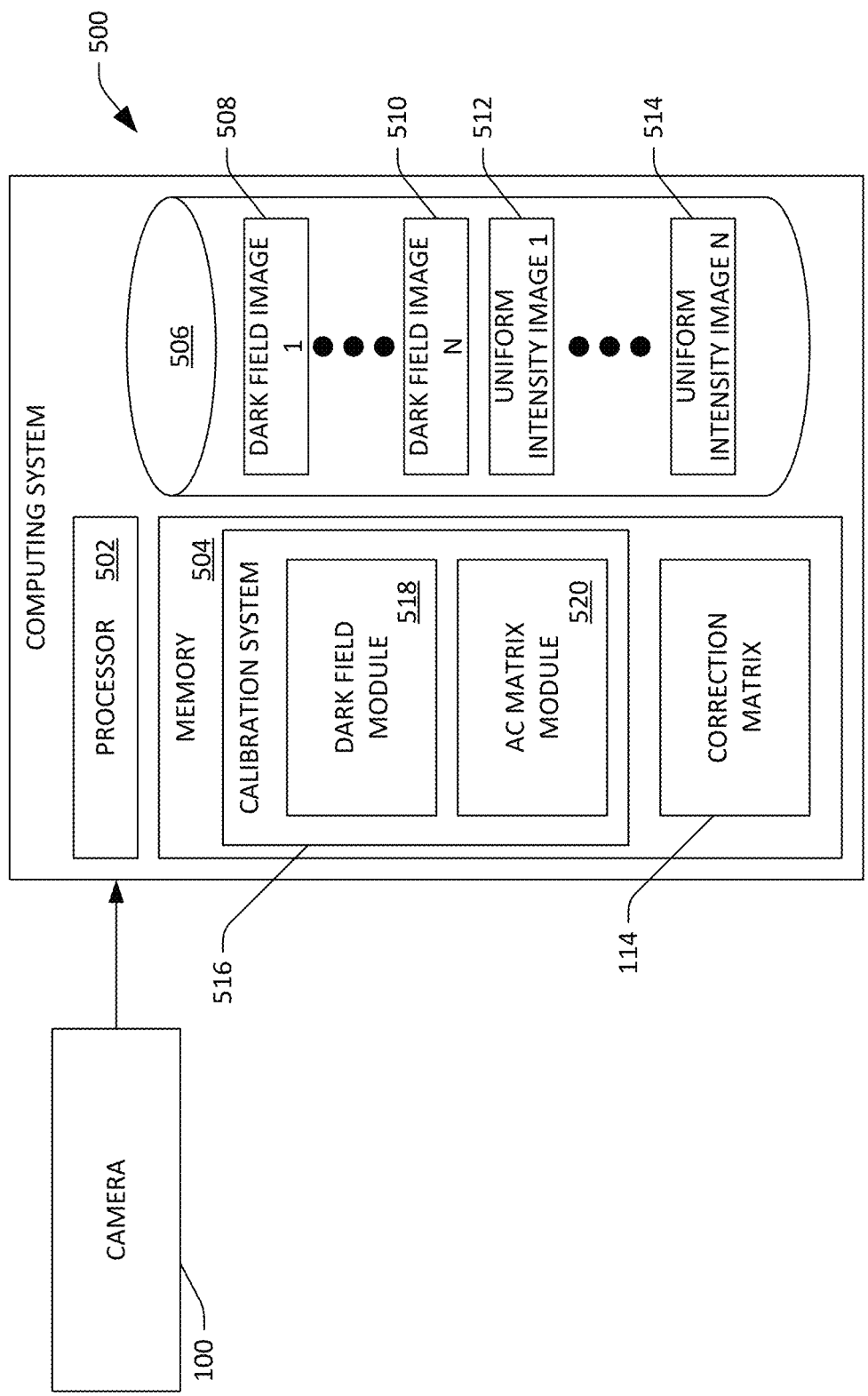
FIG. 5 is a functional block diagram of a computing system that is configured to compute a matrix of correction factors for use when correcting images generated by a camera having a global shutter.

Turning now to FIG. 5, a functional block diagram of a computing system 500 that is configured to generate the correction matrix 114 is illustrated. The computing system 500 includes a processor 502 and memory 504, where the memory 504 includes data that is accessible to the processor and instructions that are executed by the processor 502. The computing system 500 is in communication with the camera 100 and is configured to generate the correction matrix 114 based upon data frames generated by the camera 100.

For example, the camera 100 can be configured to generate dark field images (where, when the dark field images are captured, a flat field intensity of light applied across pixels of the image sensor 102 is zero). The camera 100 is further configured to generate the dark field images such that each dark field image is captured with a different exposure time. The data store 506 includes a first dark field image 508 through an Nth dark field image 510, where the first dark field image was generated when the camera 100 used a first exposure time, and the Nth dark field image was generated when the camera 100 used an Nth exposure time.

The data store 506 further includes uniform intensity images 512-514 generated by the camera 100, where each image in the uniform intensity images 512-514 was generated with a different exposure time, and further where the uniform intensity images 512-514 were generated by the camera 100 when a flat field of light with uniform intensity was applied across the image sensor 102. Hence, the first uniform intensity image 512 was generated by the camera 100 with a first exposure time when a flat field of light of uniform intensity was applied across the image sensor 102, and the uniform intensity image N 514 the generated by the camera 100 with an Nth exposure time when the flat field of light of uniform intensity was applied across the image sensor 102.

The memory 504 includes a calibration system 516 that, when executed by the processor 502, generates the correction matrix 114 based upon the images 508-514 in the data store 506. As described above, a value read from a memory node of a pixel in the image sensor 102 by the readout electronics 104 represents is an aggregate of three different portions: 1) an intensity of light incident upon the pixel over the exposure time (the portion of the value that should match the input); 2) a dark signal portion (the portion of the readout value that is attributable to background noise), and 3) a PRNU portion caused by parasitic light sensitivity of the memory node of the pixel and system gain. A correction factor for the pixel in the correction matrix 114, when applied to the value readout from the memory node of the pixel, is configured to account for the second and third portion in the value, thereby leaving the desired output. The calibration system 516 is configured to compute a correction factor for each pixel in the image sensor 102 based upon the images 508-514.

To that end, the calibration system 516 includes a dark field module 518 that is configured to compute, for each pixel in the image sensor 102, a dark field signal correction factor based upon the dark field images 508-510. It has further been observed that the dark field signal value increases linearly with integration time. Hence, the dark field module 518, with respect to the pixel, can perform a linear fitting to compute a slope for the dark field signal value, where the slope represents rate of change of the dark field signal value with respect to integration time. A correction factor in the correction matrix 114 for the pixel includes a dark field constant value and the slope. The dark field constant value can be set as the intercept of the linear fitting (where the integration time is set to zero). Subsequent to calibration, when the camera 100 is employed to generate an image with a certain integration time, the dark field constant value and the slope multiplied by the integration time can be subtracted from the value from the memory node of the pixel readout by the readout electronics 104, thereby removing the dark field signal portion from the readout value.

The calibration system 516 additionally includes an AC matrix module 520 that is configured to compute, for each pixel, a correction factor that addresses parasitic light sensitivity of the pixel and system gain associated with the pixel, wherein the AC matrix module 520 computes such correction factor based upon the uniform intensity images 512-514. Contrary to conventional approaches, the AC matrix module 520 computes the correction factor for a pixel by normalizing values for the pixel in the uniform intensity images 512-514 based upon values for at least one pixel in the images 512-514, where the at least one pixel is in a row that is readout first by the readout electronics 104.

In a more specific example, in the first uniform intensity image 512, the AC matrix module 520 can identify a row in such image 512 that corresponds to a row of pixels in the image sensor 102 that was readout first (before any other rows in the image sensor 102) by the readout electronics 104. The AC matrix module 520 may then compute a mean value for such row. When computing a correction factor for a pixel in the image sensor 102, the AC matrix module 520, for example, identifies a value that corresponds to the pixel in the first uniform intensity image 512 and then normalizes that value through use of an average of values in a row of the first uniform intensity image 512 that were readout first by the readout electronics 104. The first row of pixels is selected due to the input to the image sensor being uniform (a uniform flat field of light intensity), and therefore the output should also be uniform and, except for the constant dark field signal portion of values in the first row, should be approximately equivalent to the values in the first row of pixels.

Referring again to a single pixel, a respective normalized value is computed for the pixel for each of the uniform intensity images 512-514 (e.g., N normalized values). These N values form a non-linear curve, and the AC matrix module 520 can perform a nonlinear fitting to identify a function that fits the N normalized values. The correction factor for the pixel can thus be the dark signal constant value, the slope of the dark signal value, and the function computed by the AC matrix module 520. When the camera 100 is subsequently employed to capture an image, the value read from a pixel by the readout electronics 104 can be corrected through utilization of the corresponding correction factor for the pixel in the correction matrix 114. As noted above, the correction matrix 114 includes a correction factor for each pixel in the image sensor 102.

Figure 6:
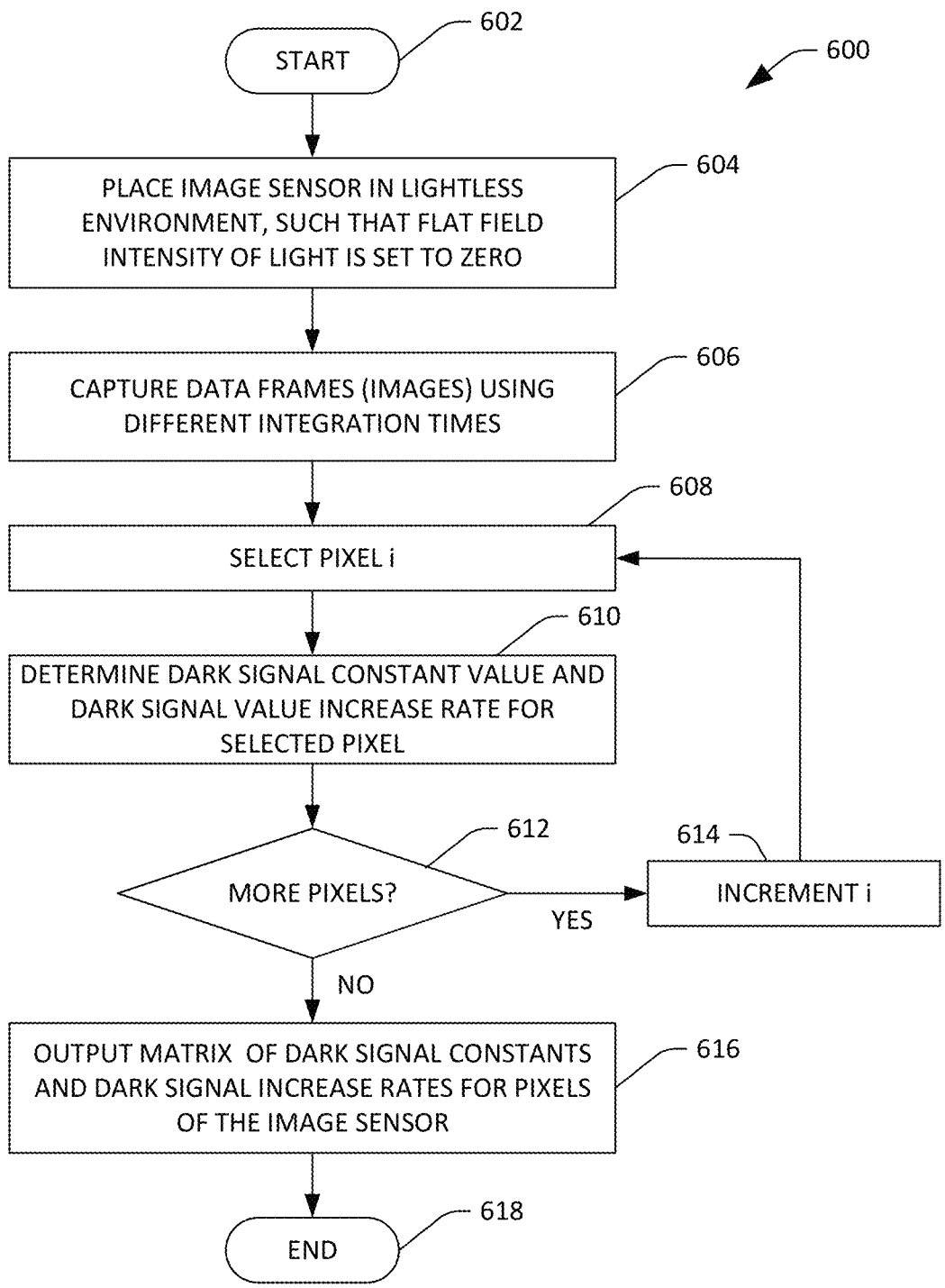
FIG. 6 is a flow diagram illustrating a methodology for outputting a matrix of dark signal correction factors for a camera having a global shutter.
Figure 8:
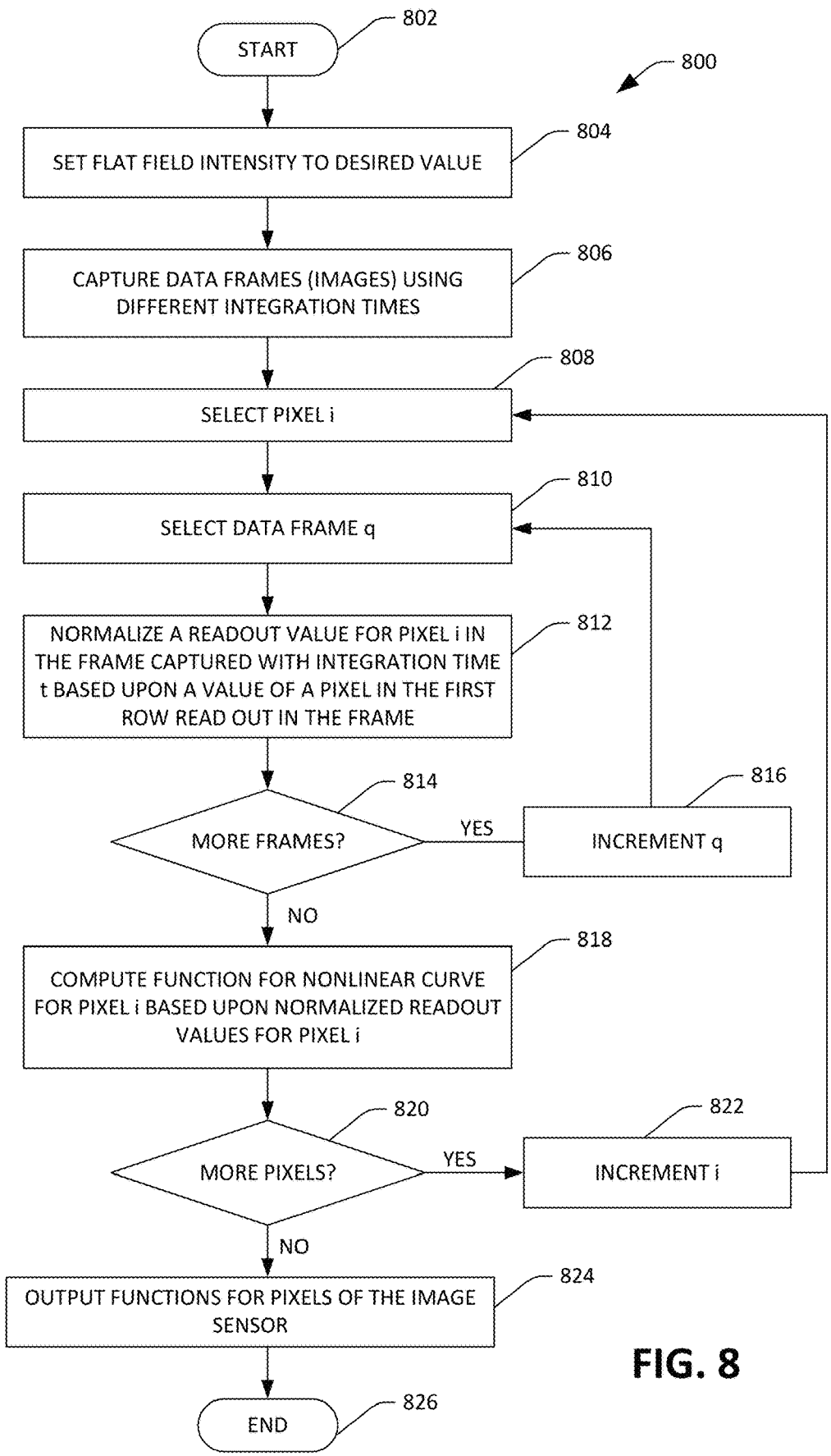
FIG. 8 is a flow diagram of a methodology for outputting correction factors for pixels of a camera having a global shutter, where the correction factors are configured to address PRNU caused by parasitic light sensitivity and system gain with respect to pixels in a camera having a global shutter.
Figure 10:
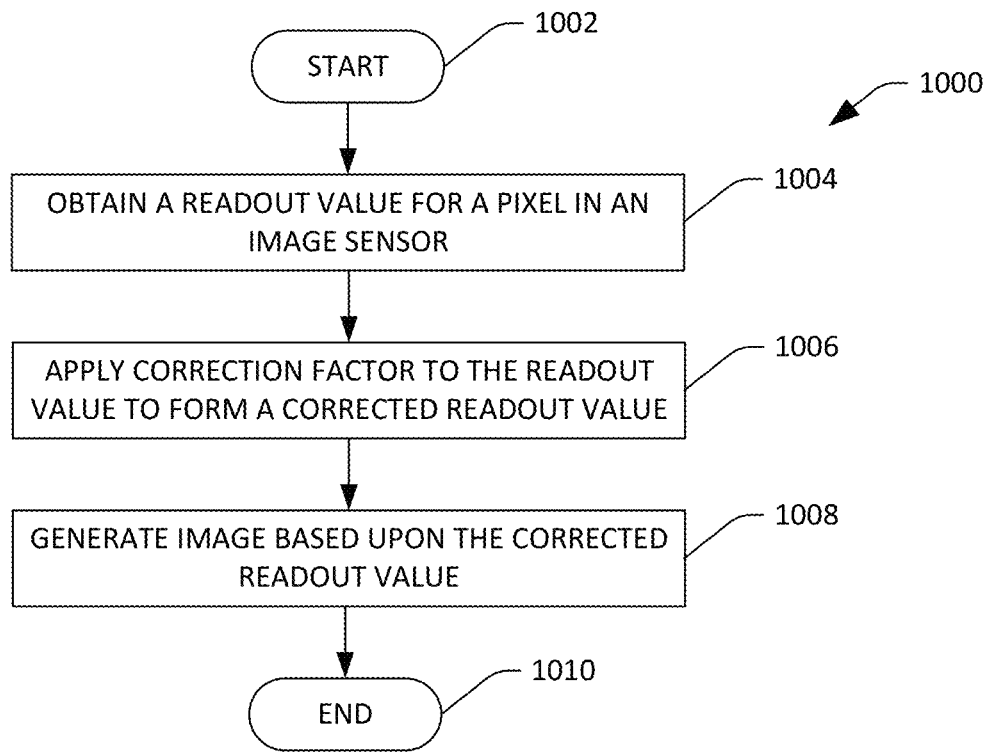
FIG. 10 is a flow diagram of a methodology for generating a corrected image by applying correction factors to pixels of the image.

Referring to FIGS. 6, 8, and 10, methodologies that are performed by the computing system 500 and/or the camera 100 are illustrated. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, some of the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now solely to FIG. 6, a flow diagram illustrating an example methodology 600 computing dark signal constant values and rates of change of dark signal values for the pixels in the image sensor 102 is illustrated. The methodology 600 starts at 602, and at 604 an image sensor is positioned in a lightless environment, such that a flat field light intensity applied across pixels of the image sensor 102 is zero. At 606, data frames (images) are captured using different integration times. It is to be understood that any suitable number of images can be generated, each with a different integration time. For instance, four images, eight images, twelve images, etc.

At 608, pixel i is selected (where i initially equals one). At 610, a dark signal constant value and dark signal value increase rate (rate of change) are determined for pixel i, as described above. At 612, a determination is made as to whether there are additional pixels for which dark signal constant values and dark signal value increase rates are to be computed. If it is determined at 612 that there are more pixels (e.g., i is less than the number of pixels in the image sensor 102), then the methodology 600 proceeds to 614, where i is incremented. The methodology 600 then returns to 608, where the next pixel is selected. When it is determined at 612 that there are no more pixels, at 616 a matrix of dark signal constant values and dark signal value increase rates is output for pixels of the image sensor 102. The methodology completes at 618.

Figure 7:
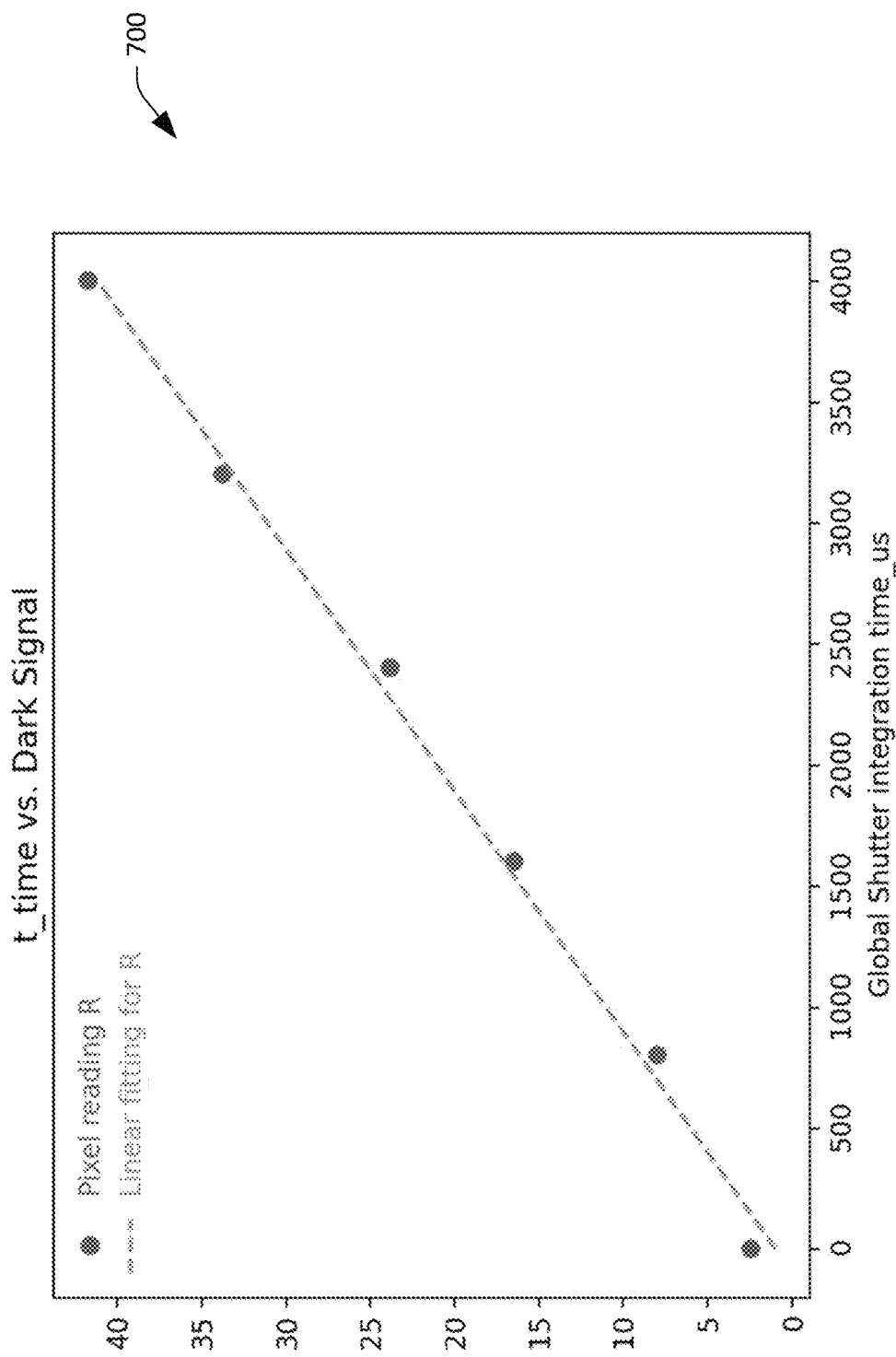
FIG. 7 is a plot that depicts a linear fitting of values readout from a pixel in a camera having a global shutter, where the values correspond to different integration times.

Referring to FIG. 7, a plot 700 that depicts values readout from a pixel in the image sensor 102 with respect to data frames generated in a dark field with different integration times is depicted. As can be ascertained, in the example plot 700, six different values are illustrated, where the increase in magnitude of the values in the data frames with respect to integration time is approximately linear. A linear fitting can be performed on such values to determine the rate of change of dark signal values with respect to the global shutter integration time, as well as the dark signal constant value.

Now referring to FIG. 8, a flow diagram illustrating a methodology 800 for computing an "A+C" matrix is illustrated. The methodology 800 starts at 802, and at 804 a flat field intensity to be applied across the image sensor 102 is set to a desired value (non-zero). For instance, the value can be somewhere in the operating range of the camera 100 (to avoid over or under saturation). At 806, data frames are captured using different integration times. At 808, pixel i is selected (where i is initially set to one).

At 810, data frame q associated with a qth integration time is selected. At 812, a readout value for pixel i in the qth data frame is normalized based upon a value of a second pixel in the qth data frame, where the second pixel in the qth data frame corresponds to a row of pixels in the image sensor 102 that was readout first by the readout electronics 104. In a more specific example, as indicated above, the readout value for pixel i in data frame q is normalized at 812 based upon an average value of values in a row in data frame q that correspond to the row of pixels in the image sensor 102 that were first readout by the readout electronics 104 when generating data frame q. At 814, a determination is made as to whether there are additional data frames to consider. When it is determined at 814 that there are additional data frames to consider, the methodology 800 proceeds to 816, where q is incremented, and the next data frame is selected 810.

When it is determined at 814 that there are no more data frames to consider, then at 818 a nonlinear fitting is performed on the normalized readout values for pixel i to identify a function that fits the curve formed by the normalized values.

At 820, a determination is made as to whether there are additional pixels to consider (e.g., whether i is less than the number of pixels in the image sensor 102). When it is determined that there are additional pixels to consider, the methodology proceeds to 822 where i is incremented. Thereafter, the methodology 800 returns to 808. When it is determined at 820 that there are no more pixels to consider, the methodology 800 proceeds to 824, where functions for pixels of the image sensor 102 are output for inclusion in the correction matrix 114. The methodology 800 completes at 826.

Figure 9:
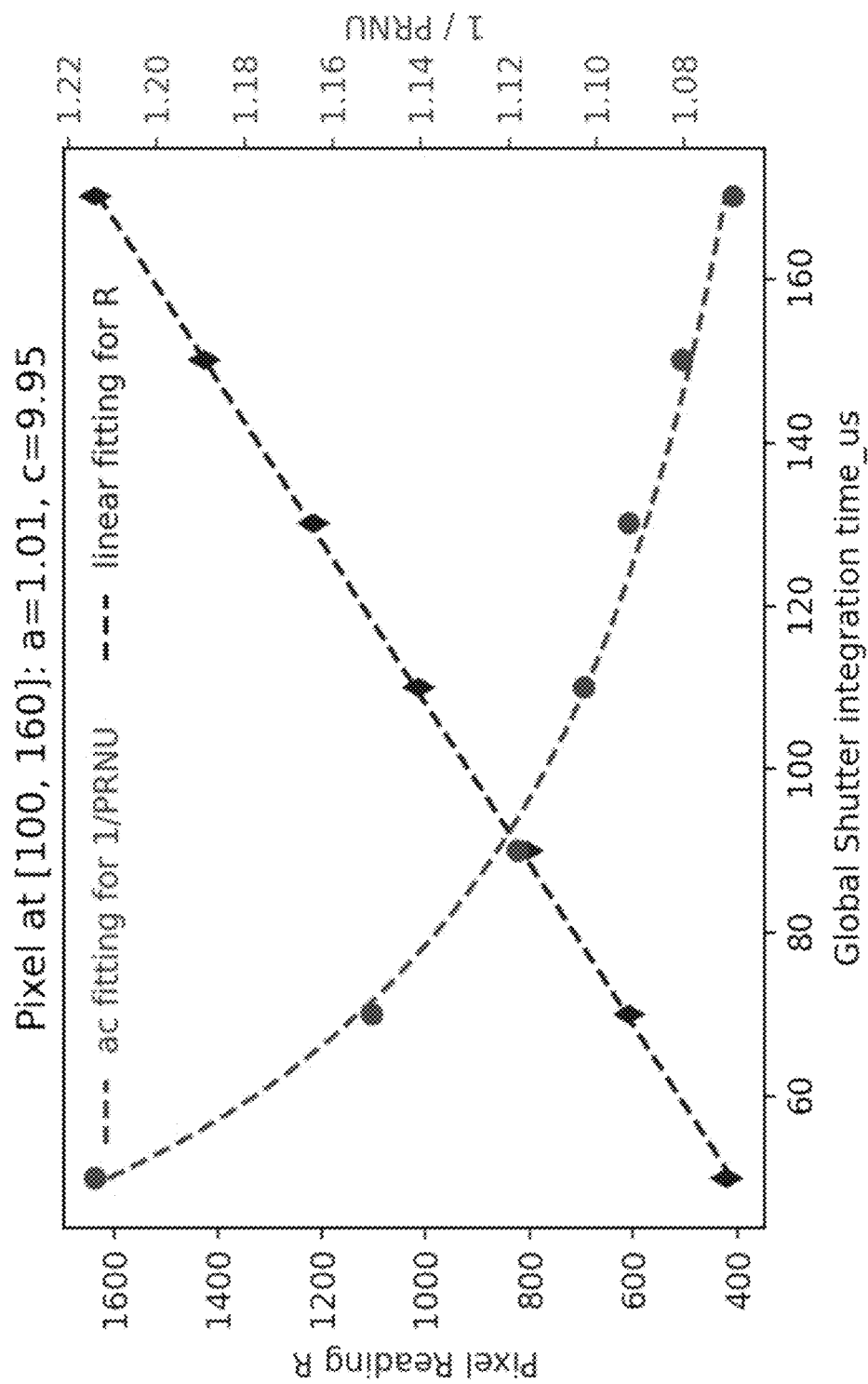
FIG. 9 is a plot that depicts a nonlinear fitting of values assigned to a pixel in an image sensor of a camera having a global shutter.

With brief reference to FIG. 9, a plot that illustrates a nonlinear fitting of normalized values for a pixel is presented. The plot 900 depicts values for a single pixel; it is again emphasized that a function can be computed for each pixel in the image sensor 102.

Referring now to FIG. 10, a flow diagram illustrating a methodology 1000 for generating an image using a camera with a global shutter (and addressing PRNU) is illustrated. The methodology 1000 starts at 1002, and at 1004 a readout value for a pixel in an image sensor is received. At 1006, a correction factor is applied to the readout value to form a corrected readout value, where the correction factor is applied to the readout value to address PRNU of the pixel. The correction factor is computed based upon a second readout value of a second pixel in a row from amongst several rows of the image sensor, where the second readout value was previously obtained when a uniform light field was applied over pixels of the image sensor, and further wherein the values from pixels in the row were readout prior to reading of values from pixels in any other row in the several rows of the image sensor. At 1008, an image is generated based upon the corrected readout value. The methodology 1000 completes at 1010.

A mathematical description of application of a correction factor and computation of the correction factor is now set forth. With respect to a single pixel in the image sensor 102:

$$r = g(It + pI\Delta t) + d, \quad (1)$$

where r is a value readout from the pixel, g is the system gain, I is the intensity of light incident upon the pixel (the input), t is the integration time, p is the parasitic light sensitivity, $\Delta t$ is time added to readout the signal from the pixel after the global shutter is closed, and d is the dark signal.

The dark signal can be represented as follows:

$$d = dst + d_0, \quad (2)$$

where ds is the increase rate of the dark signal value and $d_0$ is the dark signal constant value, which can be determined by linearly fitting $r = ds\ t + d_0$, with I=0. A noiseless reading from the pixel can be obtained by subtracting d from r:

$$m = r - d = (1 + p\Delta t/t)gIt. \quad (3)$$

Eq. (1) can be modified to represent all pixels of the image sensor 102 as follows:

$$R[x,y] = G[x,y](I[x,y]t + P[x,y]I[x,y]\Delta T[x,y]) + D[x,y], \quad (4)$$

where capital letters denote matrices, and where [x, y] are coordinates for a pixel located at [x, y] on the image sensor 102. The above can be simplified by omitting the [x, y] coordinates annotation as follows:

$$R = G(It + PI\Delta T) + D. \quad (5)$$

Equation (3), written using matrix annotation, is as follows:

$$M = (1 + P\Delta t/t)GIt. \quad (6)$$

As M represents the noiseless output values of pixels in the image sensor, the correction module 112 can correct for PRNU by way of the following algorithm:

$$Y = KM, \quad (7)$$

where Y is the corrected image (e.g., the image 116) output by the correction module 112 and K represents corrections factors for pixels in the raw image 110.

K can be ascertained during the calibration procedure described herein. As described previously, a uniform flat field $I^0$ is applied across the image sensor 102. Since $I^0$ is uniform, when a correction factor is applied to the noiseless output values, the output should also be uniform. Hence:

$$Y^0 = KM^0 = KGI^0 t\left(1 + P\frac{\Delta T}{t}\right). \quad (8)$$

As values of pixels readout first by the readout electronics 104 have negligible parasitic light sensitivity, $Y^0$ can be presumed to be equivalent to the mean of the values of the aforementioned pixels (e.g., values of pixels in the first row that are readout immediately after the global shutter is closed: $\overline{M_{[0,:]}^0}$). Therefore, $\overline{M_{[0,:]}^0} = K\ M^0$, and thus $K = \overline{M_{[0,:]}^0}/M^0$.

Because the parasitic light sensitivity is negligible for values readout from pixels in the first row, $\overline{M_{[0,:]}^0} \sim \overline{G_{[0,:]}} I^0 t$. Given such assumption, the following derivation can be undertaken:

$$M^0 = GI^0 t\left(1 + P\frac{\Delta T}{t}\right) \quad (9)$$

$$K = \overline{M^0}/M^0 = \overline{G_{[0,:]}}/(G(1 + P\Delta T/t))$$

$$K = \frac{1}{A + \frac{C}{t}}$$

$$A = G/\overline{G_{[0,:]}} \text{ (the } A \text{ matrix)}$$

$$C = P\Delta TG/\overline{G_{[0,:]}} \text{ (the } C \text{ matrix)}$$

$$Y = \frac{M}{A + \frac{C}{t}}$$

$$Y^0 = \frac{M^0}{A + \frac{C}{t}}$$

$$A + C/t = M^0/Y^0 = M^0/\overline{M_{[0,:]}^0},$$

where matrices A and C can be nonlinearly fitted by sweeping different integration times with uniform flat field $I^0$.

Once $D_s t$, $D_0$, and $(A+C/t)$ are identified with the integration time t, the correction module 112 can correct a raw image R to obtain a corrected image Y by way of the following algorithm:

$$Y = (R - D_s t - D_0)/(A + C/t) \quad (10)$$

Figure 11:
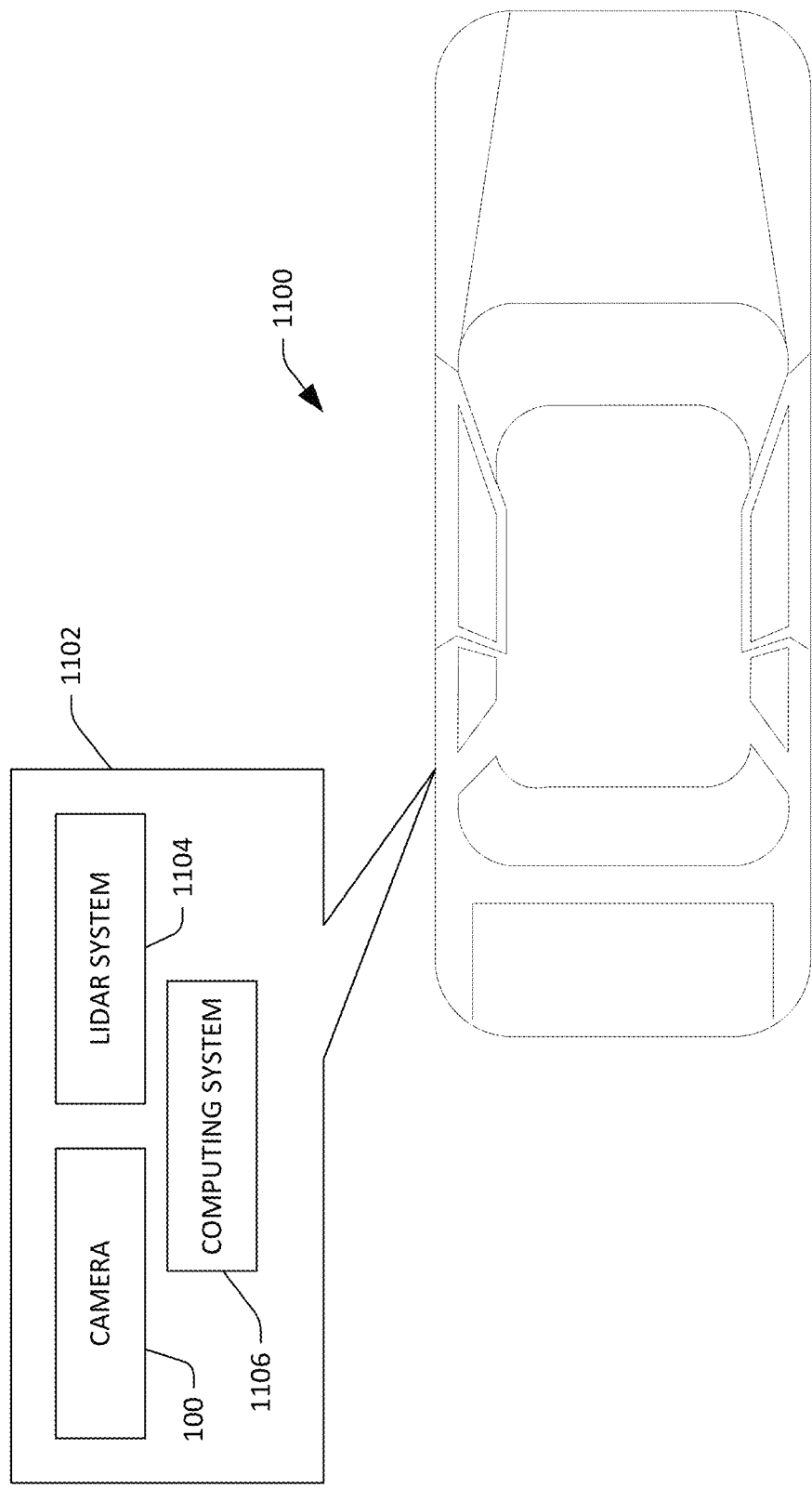
FIG. 11 is a schematic that illustrates an autonomous vehicle (AV) that includes a camera having a global shutter.

Referring now to FIG. 11, an AV 1100 is illustrated. As depicted in callout 1102, the AV 1100 includes the camera 100, a lidar system 1104, and a computing system 1106. The computing system 1106 is in communication with the camera 100 and the lidar system 1104. The computing system 1106 is configured to receive a corrected image output by the camera 100 and is further configured to receive a point cloud that is representative of distances to objects in proximity to the AV 1100 from the lidar system 1104. The computing system 1106 causes the AV 1100 to perform a driving maneuver based upon the corrected image output by the camera 100 and the point cloud output by the lidar system 1104. For instance, the computing system 1106 can be configured to control a propulsion system of the AV 1100, where the propulsion system can be or include an electric motor, a combustion engine, etc. In another example, the computing system 1106 is configured to control a steering mechanism of the AV 1100 based upon the corrected image output by the camera 100 and the point cloud output by the lidar system 1104. In still yet another example, the computing system 106 is configured to control a braking system of the AV 1100 based upon the corrected image output by the camera 100 and the point cloud output by the lidar system 1104.

Figure 12:
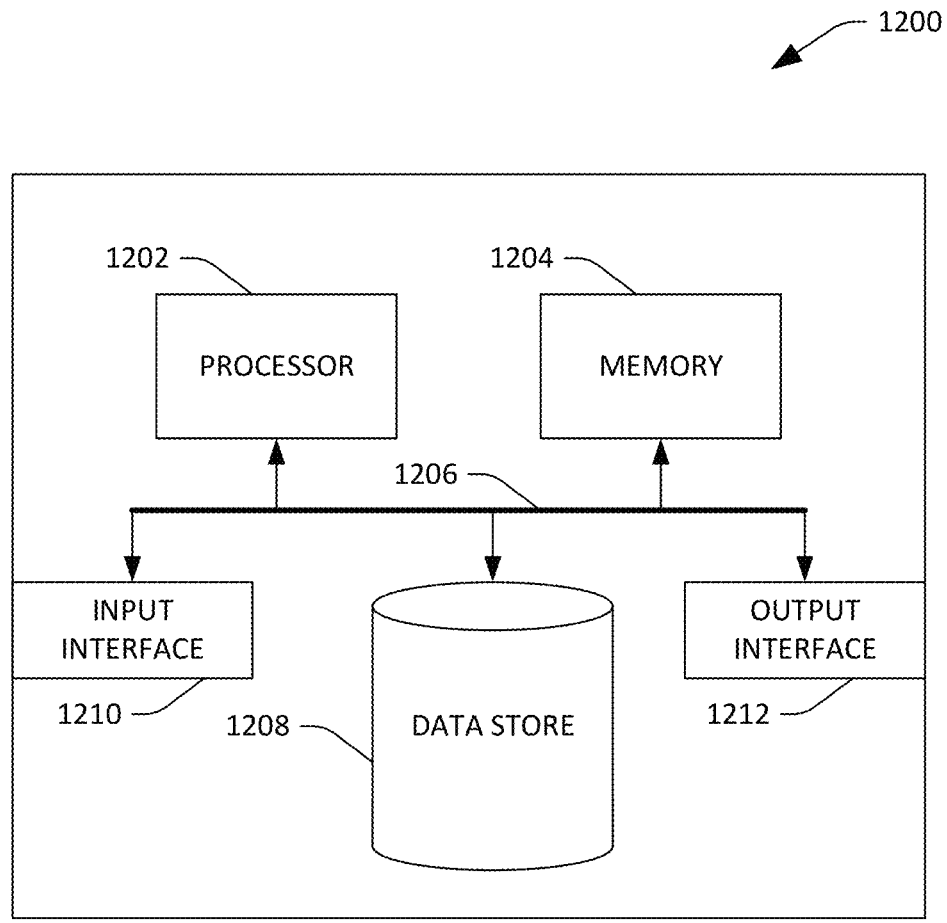
FIG. 12 is an example computing system.

Referring now to FIG. 12, a high-level illustration of an exemplary computing device 1200 that can be used in accordance with the systems and methodologies disclosed herein is illustrated. For instance, the computing device 1200 may be used in a system that is configured to correct an image created by a camera having a global shutter. By way of another example, the computing device 1200 can be used in a system that is configured to compute correction factors to use when correcting an image. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store pixel values, correction factors, images, calibration settings, etc.

The computing device 1200 additionally includes a data store 1208 that is accessible by the processor 1202 by way of the system bus 1206. The data store 1208 may include executable instructions, images, correction factors, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to generating an improved image as output by a camera having a global shutter according to at least the examples provided below.

(A1) In one aspect, some embodiments include a method performed by processing circuitry of a camera having a global shutter, where the processing circuitry is in communication with an image sensor of the camera. The method includes receiving a readout value for a pixel in the image sensor. The method also includes applying a correction factor to the readout value to form a corrected readout value. The correction factor is applied to the readout value to address PRNU of the pixel. The correction factor is computed during a calibration process based upon a second readout value of a second pixel in a row from amongst the several rows, where the second readout value was previously obtained during the calibration process when a uniform light field was applied over the image sensor, wherein the processing circuitry reads out values from pixels in the row prior to reading out values from pixels in any other row in the several rows. The method further includes generating an image based upon the corrected readout value.

(A2) In some embodiments of the method of A1, the method also includes receiving a third readout value for a third pixel of the image captured by the camera, where the pixel is in a second row in the several rows and the third pixel is in a third row in the several rows, the third row being different from the second row. The method additionally includes applying a second correction factor to the third readout value to form a second corrected readout value. The second correction factor is applied to the third readout value to address PRNU of the third pixel. The second correction factor is computed during the calibration process based upon an average of the readout values of pixels in the row from amongst the several rows when the uniform light field was applied over the image sensor, where the image is generated based further upon the second corrected readout value.

(A3) in some embodiments of any of the methods of A1-A2, the correction factor is further computed based upon a dark signal value for the pixel, wherein the dark signal value is representative of a portion of the readout signal that is not caused by light that is incident upon the pixel.

(A4) in some embodiments of the method of A3, the dark signal value is computed based upon an integration time for the camera.

(A5) in some embodiments of any of the methods of A1-A4, the correction factor is computed based upon a first value readout from the pixel when the uniform light field was applied over the pixel when the camera captured a first image using a first exposure time. In addition, the correction factor is computed based upon a second value readout from the pixel when the camera was placed in an environment with no light and captured a second image using a second exposure time.

(A6) In some embodiments of any of the methods of A1-A5, an autonomous vehicle comprises the camera and performs a driving maneuver based upon the image generated by the camera.

(A7) In some embodiments of any of the methods of A1-A6, the calibration process includes: a) applying a uniform flat field intensity of zero across the several rows of pixels; b) while the uniform flat field of the intensity of zero is applied across the several rows of pixels, capturing images with different respective integration times; c) for each of the images captured, reading out respective values of the pixel; and d) linearly fitting the respective values of the pixel to determine a slope, wherein the correction factor is computed based upon the slope.

(A8) In some embodiments of the method of A7, the calibration process further includes: e) applying a second uniform flat field intensity across the several rows of pixels, the second uniform flat field intensity being non-zero; f) while the second uniform flat field intensity is applied across the several rows of pixels, capturing second images with different respective integration times; g) for each of the second images captured, reading out second respective values of the pixel; h) normalizing the second respective values of the pixel based upon the readout value of the second pixel; and i) non-linearly fitting the second respective values of the pixel to determine a function, wherein the correction factor is computed based upon the function.

(B1) In another aspect, some embodiments include a method performed by processing circuitry of a camera having a global shutter. The method includes receiving a readout value for a pixel in an image sensor of the camera. The method further includes applying a correction factor to the readout value to form a corrected readout value. The correction factor is applied to the readout value to address PRNU of the pixel. The correction factor is computed based upon a second readout value of a second pixel in a row from amongst the several rows, where the second readout value was previously obtained when a uniform light field was applied over the image sensor, and further where the processing circuitry reads out values from pixels in the row prior to reading out values from pixels in any other row in the several rows. The method additionally includes generating an image based upon the corrected readout value.

(B2) In some embodiments of the method of B1, the method further includes receiving a third readout value for a third pixel of the image captured by the camera, wherein the pixel is in a second row in the several rows and the third pixel is in a third row in the several rows, the third row being different from the second row. The method also includes applying a second correction factor to the third readout value to form a second corrected readout value, wherein the second correction factor is applied to the third readout value to address PRNU of the third pixel, and further wherein the second correction factor is computed based upon an average of the readout values of pixels in the row from amongst the several rows when the uniform light field was applied over the image sensor, wherein the image is generated based further upon the second corrected readout value.

(B3) In some embodiments of any of the methods of B1-B2, the correction factor is further computed based upon a dark signal value for the pixel, wherein the dark signal value is representative of a portion of the readout signal that is not caused by light that is incident upon the pixel.

(B4) In some embodiments of the method of B3, the dark signal value is computed based upon an integration time for the camera.

(B5) In some embodiments of any of the methods of B1-B4, the correction factor is computed based upon: 1) a first value readout from the pixel when the uniform light field was applied over the pixel when the camera captured a first image using a first exposure time; and 2) a second value readout from the pixel when the camera was placed in an environment with no light and captured a second image using a second exposure time.

(B6) In some embodiments of any of the methods of B1-B5, each pixel of the camera has a respective correction factor assigned thereto.

(B7) In some embodiments of any of the methods of B1-B6, an autonomous vehicle comprises the camera and performs a driving maneuver based upon the image generated by the camera.

(B8) In some embodiments of any of the methods of B1-B7, the correction factor is computed based upon a calibration procedure, wherein the calibration procedure includes: a) applying a flat field intensity of zero across the several rows of pixels; b) while the uniform flat field of the intensity of zero is applied across the several rows of pixels, capturing images with different respective integration times; c) for each of the images captured, reading out respective values of the pixel; and d) linearly fitting the respective values of the pixel to determine a slope, wherein the correction factor is computed based upon the slope.

(B9) In some embodiments of the method of B8, the calibration procedure further comprises: e) applying a uniform flat field intensity across the several rows of pixels, the uniform flat field intensity being non-zero, f) while the uniform flat field intensity is applied across the several rows of pixels, capturing second images with different respective integration times; g) for each of the second images captured, reading out second respective values of the pixel; h) normalizing the second respective values of the pixel based upon the readout value of the second pixel; and i) non-linearly fitting the second respective values of the pixel to determine a function that defines a curve of the second respective values, wherein the correction factor is computed based upon the function.

(B10) In some embodiments of the method of B9, the second respective values of the pixel are normalized based upon several readout values from pixels in the row.

(B11) In some embodiments of any of the methods of B1-B10, the camera is included in an autonomous vehicle, where the autonomous vehicle includes a lidar system and a computing system, where the computing system detects an object in a scene based upon the image and a point cloud generated by the lidar system, and further wherein the computing system causes the autonomous vehicle to perform the driving maneuver based upon the image and the point cloud.

(C1) In yet another aspect, some embodiments include a camera having a global shutter, where the camera includes an image sensor that includes several rows of pixels, where each row of pixels includes several pixels. The camera further includes processing circuitry that is electrically coupled to the image sensor, where the processing circuitry is configured to perform any of the methods described herein (e.g., any of A1-A8 or B1-B11).

(D1) In still yet another aspect, some embodiments include a computer-readable storage medium comprising instructions that, when executed by processing circuitry of a camera with a global shutter, cause the processing circuitry to perform any of the methods described herein (e.g., any of A1-A8 or B1-B11).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A camera having a global shutter, the camera comprising:
   an image sensor that includes several rows of pixels, where each row of pixels includes several pixels; and
   processing circuitry that is electrically coupled to the image sensor, wherein the processing circuitry is configured to perform acts comprising:
      receiving a readout value for a pixel in the image sensor;
      applying a correction factor to the readout value to form a corrected readout value, wherein the correction factor is applied to the readout value to address photo response non-uniformity (PRNU) of the pixel, wherein the correction factor is computed based upon a second readout value of a second pixel in a row from amongst the several rows, the second readout value previously obtained when a uniform light field was applied over the image sensor, and further wherein the processing circuitry reads out values from pixels in the row prior to reading out values from pixels in any other row in the several rows; and
      generating an image based upon the corrected readout value.

2. The camera of claim 1, the acts further comprising:
   receiving a third readout value for a third pixel of the image captured by the camera, wherein the pixel is in a second row in the several rows and the third pixel is in a third row in the several rows, the third row being different from the second row; and
   applying a second correction factor to the third readout value to form a second corrected readout value, wherein the second correction factor is applied to the third readout value to address PRNU of the third pixel, and further wherein the second correction factor is computed based upon an average of the readout values of pixels in the row from amongst the several rows when the uniform light field was applied over the image sensor, wherein the image is generated based further upon the second corrected readout value.

3. The camera of claim 1, wherein the correction factor is further computed based upon a dark signal value for the pixel, wherein the dark signal value is representative of a portion of the readout signal that is not caused by light that is incident upon the pixel.

4. The camera of claim 3, wherein the dark signal value is computed based upon an integration time for the camera.

5. The camera of claim 1, wherein the correction factor is computed based upon:
   a first value readout from the pixel when the uniform light field was applied over the pixel when the camera captured a first image using a first exposure time; and
   a second value readout from the pixel when the camera was placed in an environment with no light and captured a second image using a second exposure time.

6. The camera of claim 1, wherein each pixel of the camera has a respective correction factor assigned thereto.

7. The camera of claim 1, wherein an autonomous vehicle comprises the camera and performs a driving maneuver based upon the image generated by the camera.

8. The camera of claim 1, wherein the correction factor is computed based upon a calibration procedure, wherein the calibration procedure comprises:
   applying a flat field intensity of zero across the several rows of pixels;
   while the uniform flat field of the intensity of zero is applied across the several rows of pixels, capturing images with different respective integration times;
   for each of the images captured, reading out respective values of the pixel; and
   linearly fitting the respective values of the pixel to determine a slope, wherein the correction factor is computed based upon the slope.

9. The camera of claim 8, wherein the calibration procedure further comprises:
   applying a uniform flat field intensity across the several rows of pixels, the uniform flat field intensity being non-zero;
   while the uniform flat field intensity is applied across the several rows of pixels, capturing second images with different respective integration times;
   for each of the second images captured, reading out second respective values of the pixel;
   normalizing the second respective values of the pixel based upon the readout value of the second pixel; and
   non-linearly fitting the second respective values of the pixel to determine a function that defines a curve of the second respective values, wherein the correction factor is computed based upon the function.

10. The camera of claim 9, wherein the second respective values of the pixel are normalized based upon several readout values from pixels in the row.

11. The camera of claim 1 included in an autonomous vehicle (AV), wherein the AV comprises:
    a lidar system; and
    a computing system, wherein the computing system detects an object in a scene based upon the image and a point cloud generated by the lidar system, and further wherein the computing system causes the AV to perform the driving maneuver based upon the image and the point cloud.

12. A method performed by processing circuitry of a camera having a global shutter, wherein the processing circuitry is in communication with an image sensor of the camera, the method comprising:
    receiving a readout value for a pixel in the image sensor;
    applying a correction factor to the readout value to form a corrected readout value, wherein the correction factor is applied to the readout value to address photo response non-uniformity (PRNU) of the pixel, wherein the correction factor is computed during a calibration process based upon a second readout value of a second pixel in a row from amongst the several rows, the second readout value previously obtained during the calibration process when a uniform light field was applied over the image sensor, and further wherein the processing circuitry reads out values from pixels in the row prior to reading out values from pixels in any other row in the several rows; and
    generating an image based upon the corrected readout value.

13. The method of claim 12, further comprising:
    receiving a third readout value for a third pixel of the image captured by the camera, wherein the pixel is in a second row in the several rows and the third pixel is in a third row in the several rows, the third row being different from the second row; and
    applying a second correction factor to the third readout value to form a second corrected readout value, wherein the second correction factor is applied to the third readout value to address PRNU of the third pixel, and further wherein the second correction factor is computed during the calibration process based upon an average of the readout values of pixels in the row from amongst the several rows when the uniform light field was applied over the image sensor, wherein the image is generated based further upon the second corrected readout value.

14. The method of claim 12, wherein the correction factor is further computed based upon a dark signal value for the pixel, wherein the dark signal value is representative of a portion of the readout signal that is not caused by light that is incident upon the pixel.

15. The method of claim 14, wherein the dark signal value is computed based upon an integration time for the camera.

16. The method of claim 12, wherein the correction factor is computed based upon:
 a first value readout from the pixel when the uniform light field was applied over the pixel when the camera captured a first image using a first exposure time; and
 a second value readout from the pixel when the camera was placed in an environment with no light and captured a second image using a second exposure time.

17. The method of claim 12, wherein an autonomous vehicle comprises the camera and performs a driving maneuver based upon the image generated by the camera.

18. The method of claim 12, wherein the calibration process comprises:
 applying a uniform flat field intensity of zero across the several rows of pixels;
 while the uniform flat field of the intensity of zero is applied across the several rows of pixels, capturing images with different respective integration times;
 for each of the images captured, reading out respective values of the pixel; and
 linearly fitting the respective values of the pixel to determine a slope, wherein the correction factor is computed based upon the slope.

19. The method of claim 18, wherein the calibration process further comprises:
 applying a second uniform flat field intensity across the several rows of pixels, the second uniform flat field intensity being non-zero;
 while the second uniform flat field intensity is applied across the several rows of pixels, capturing second images with different respective integration times;
 for each of the second images captured, reading out second respective values of the pixel;
 normalizing the second respective values of the pixel based upon the readout value of the second pixel; and
 non-linearly fitting the second respective values of the pixel to determine a function, wherein the correction factor is computed based upon the function.

20. A non-transitory computer-readable storage medium comprising instructions that, when executed by processing circuitry of a camera with a global shutter, cause the processing circuitry to perform acts comprising:
 receiving a readout value for a pixel in an image sensor of the camera;
 applying a correction factor to the readout value to form a corrected readout value, wherein the correction factor is applied to the readout value to address photo response non-uniformity (PRNU) of the pixel, wherein the correction factor is computed based upon a second readout value of a second pixel in a row from amongst the several rows, the second readout value previously obtained when a uniform light field was applied over the image sensor, and further wherein the processing circuitry reads out values from pixels in the row prior to reading out values from pixels in any other row in the several rows; and
 generating an image based upon the corrected readout value.

* * * * *